Fig. 2

United States Patent Office 3,164,747
Patented Jan. 5, 1965

---

3,164,747
STATIC CHARGE CONTROL SYSTEM
Robert L. Yahnke, Munster, Ind., assignor to Standard
Oil Company, Chicago, Ill., a corporation of Indiana
Filed Oct. 18, 1961, Ser. No. 145,924
9 Claims. (Cl. 317—2)

This invention relates to the control of static electrical charges, and particularly it relates to apparatus for controlling such static charges accumulated in a moving liquid. More specifically, this invention relates to apparatus for maintaining the static charge build-up in a flowing liquid hydrocarbon stream at a level below which the danger of sparking is avoided.

In the handling of hydrocarbons such as jet fuels, benzene, gasoline, etc., and particularly in the filling of fuel tanks and storage vessels with such highly flammable liquids, the accumulation of electrical charges in the moving liquid has historically presented safety problems. It is well known that, even though a conduit carrying a liquid of low conductivity, or the storage tank being filled through the conduit, is grounded static charges are accumulated in the moving liquid. Such static charges tend to build-up to levels high enough to cause a sparking-type discharge of static electricity which may result in a serious fire, explosion or detonation. There have been numerous reported instances of such fires and explosions during the loading operations of flammable hydrocarbons in petroleum refineries and depots.

The problems caused by the build-up of static charges in hydrocarbons have long been known and much has been reported concerning these problems. A detailed discussion of the related electrical phenomena is given in the publication "Electrostatics in the Petroleum Industry," edited by A. Klinkenberg and J. L. van der Minne, Elsevier Publishing Company, New York, 1958. A number of methods have been employed in an effort to prevent the build-up of static electrical charges accumulated in hydrocarbon liquids in order to reduce the safety hazards. One such method involves the addition of anti-static additives to the liquid. However, the use of such additives may adversely affect the liquid product, and additionally, involves considerable expense and attention by an operator to insure that the proper concentration is maintained. Another method which has been proposed for preventing the build-up of static electrical charges in moving hydrocarbons is to detect low level, sub-sparking electrostatic discharges and to use these to maintain the flow rate of the liquid in a conduit at a level below which sparking does not occur. This latter method has a disadvantage of reducing the flow rate to impractical low levels in order to limit the charge generation, i.e., the electrostatic build-up in the liquid.

An object of the present invention is apparatus for controlling the electrostatic build-up in moving liquids. An additional object is apparatus for substantially neutralizing the electrical charges accumulated therein, e.g., maintaining the charges at a level below which sparking does not occur. Another object is such an apparatus which achieves the desired result without increasing the time required for loading a liquid into a storage tank, and whereby a savings may be effected by a decrease in loading time. A further object of the invention is apparatus for controlling static charges in a flowing stream which apparatus is simple in construction, but accurate in operation, and which operates automatically with a minimum of attention by operating personnel. Still a further object of the invention is a means for controlling accumulated static charges which does not cause adverse effects on the system in which it is used.

These and other objects of the invention will become apparent from the following description of the invention.

In accordance with the present invention there is provided apparatus for controlling the electrical charges accumulated in a fluid which apparatus comprises means for sensing the polarity and magnitude of the accumulated charges, charge emitter means for imparting an electrical charge of known polarity and magnitude to said fluid, power supply means connected to the emitter means, and electrical means connected to said emitter means for regulating the polarity and magnitude of the charge imparted to the fluid by the emitter means to effectively maintain the electrical charge accumulated in the fluid at a pre-determined, safe level.

The invention will be more clearly understood by reference to the following description of a preferred embodiment of the present invention read in conjunction with the accompanying drawings wherein:

FIGURE 2 is a schematic electrical circuit diagram illustrating a preferred control unit referred to in FIGURE 1.

Figure 1:
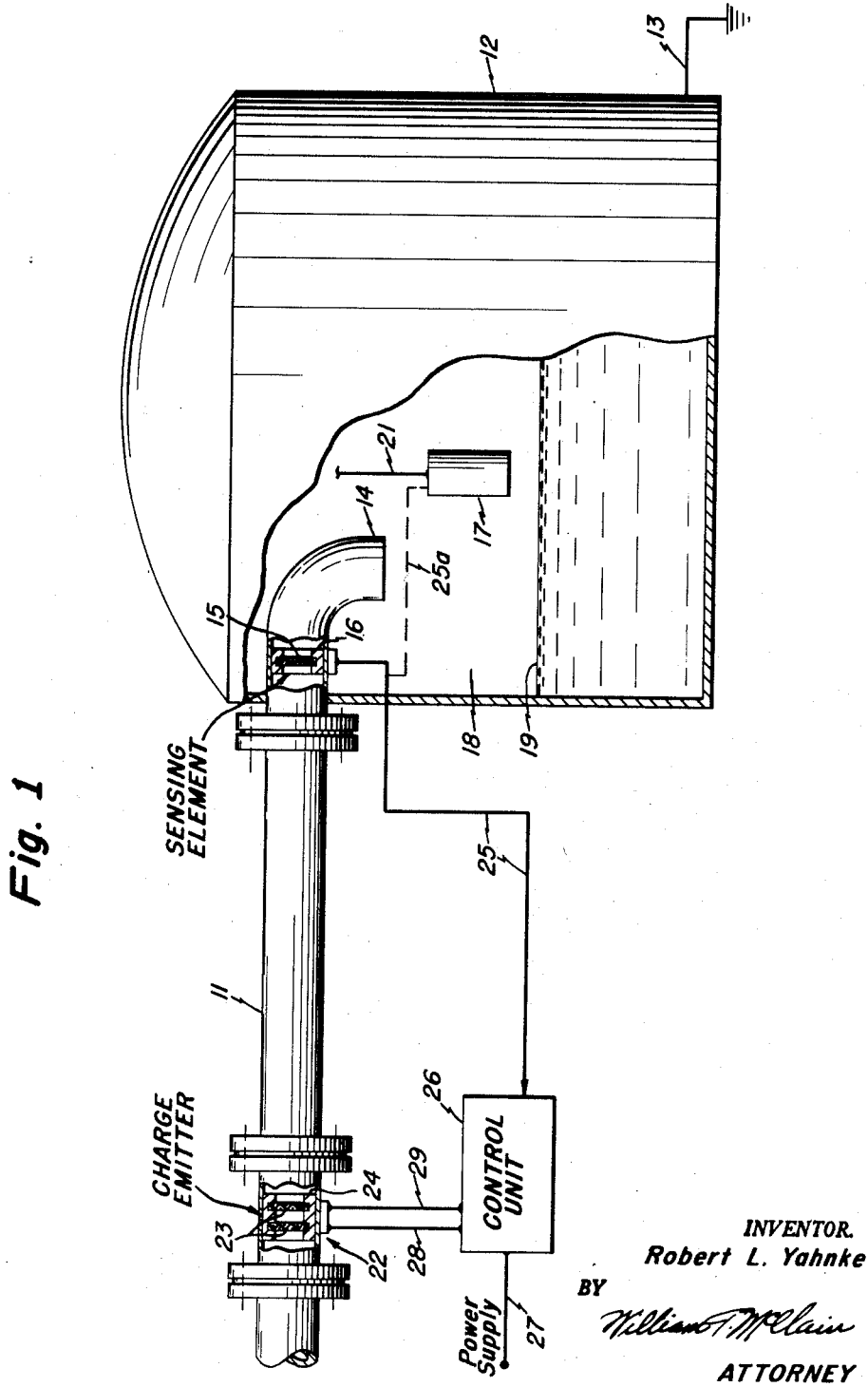
FIGURE 1 is a diagrammatic representation in partial cross-section of a storage tank and filling line system employing a preferred apparatus for controlling static charges accumulated in the system.

Referring to the drawings, in FIGURE 1 a fluid-carrying conduit 11 is utilized in filling a fluid receiver such as storage tank 12 with flammable liquid such as a jet fuel. Typically, the storage tank rests directly on the ground or is electrically grounded by means of a ground 13. A sensing element is employed to pick up and sense the electrostatic charges accumulated in the stream of gasoline flowing through the conduit 11. The sensing element can be positioned within the conduit 11 adjacent the discharge end 14 thereof as in the case of the probe element 15. The probe element 15 is in direct contact with the flowing liquid and may be one or more electrically conductive rod-like or mesh members supported in the conduit by an electrically insulating member such as the ring 16 of a phenol-formaldehyde, tetrafluoroethylene resin or other suitable plastic.

Alternatively, the sensing element may be a generating volt meter 17 suspended in the vapor space 18 above the liquid 19 in the tank 12. The generating volt meter is a field meter which operates on the principle that, when an insulated conductor is exposed to an electric field, a potential is induced therein which is proportional to the field strength. Such field meters are described in greater detail in the above-mentioned book "Electrostatics in the Petroleum Industry," see pages 122–123 and 173–178. The meter 17, typically, is suspended by a nylon cord 21 in the vapor space 18 at a suitable distance above the level of the liquid 19 in the tank.

A charge emitter 22 is employed to distribute electrical charges in the moving liquid and to impart to the liquid charges of the opposite polarity and proportional in magnitude to the charges picked up by the sensing element positioned downstream of the emitter. The charge emitter 22 may be selected from varying types suitable for imparting the desired charges to the moving liquid, and preferably, comprises a pair of contacting members 23 positioned in the conduit 11 in direct contact with the moving liquid. Typically, an insulating plastic ring member 24 is mounted inside the conduit, and electrically conducting metal screen or mesh contacting members are spaced apart and mounted in the ring member.

An electrical lead 25 or 25a connects the sensing element with a control unit 26 to which power is supplied by electrical lead 27 from a power source such as 115 volt, 60-cycle current. The sensing element picks up an electrical charge which is transmitted via line 25 or 25a to the control unit 26 and the control unit in turn causes a current to be supplied to the charge emitter 22 by way of electrical leads 28 or 29, which latter current is opposite in polarity to the sensed charge and proportional in magnitude to the electrical current flowing from the sensing element to the control unit, so that the charge imparted to the flowing liquid by the charge emitter causes the electrostatic charges accumulated in the liquid as a result of movement relative to solid bodies in contact therewith to be substantially neutralized and maintained at a safe low level at which a sparkling discharge does not occur in the tank 12.

Figure 2:
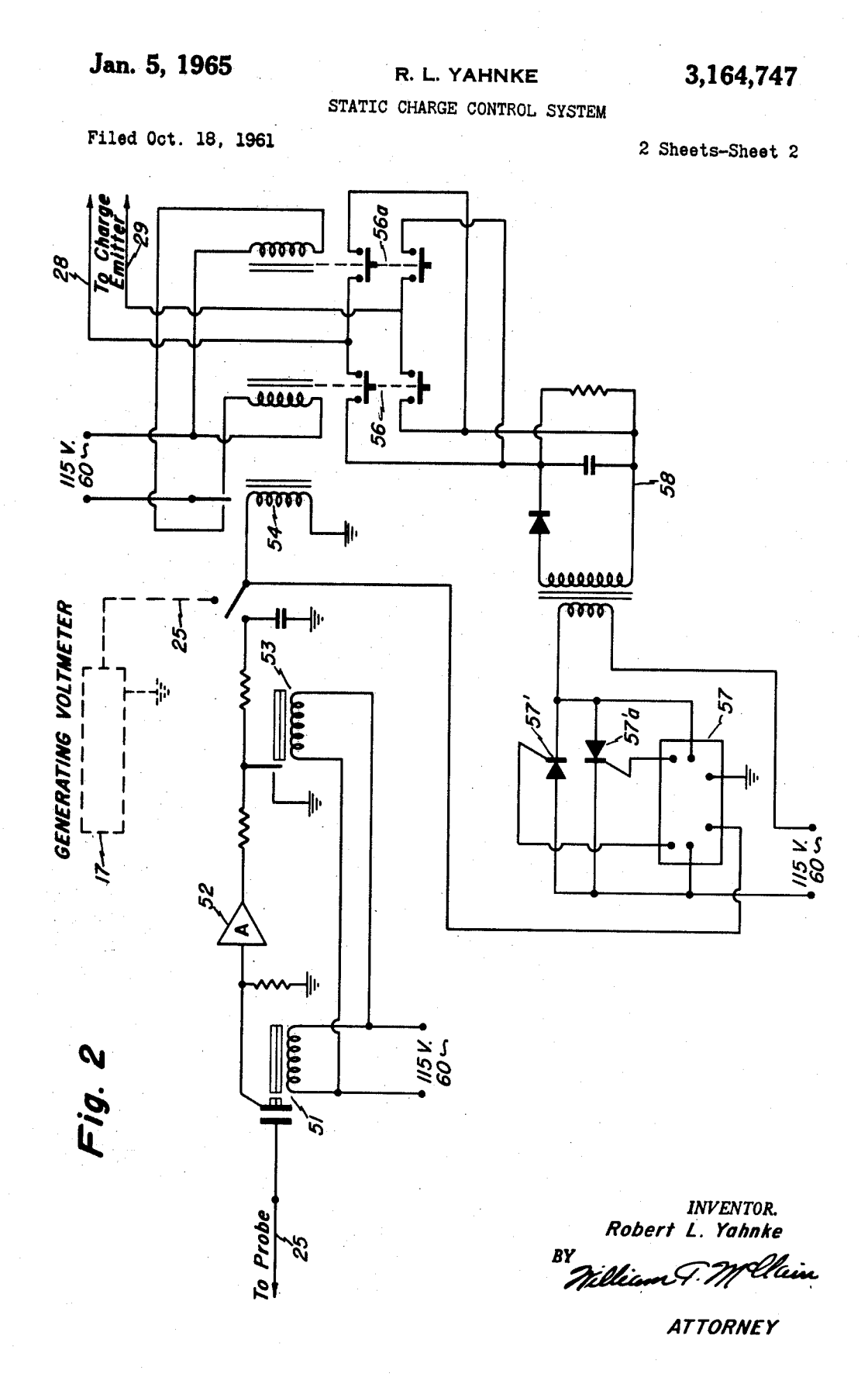

Turning now to FIGURE 2, there is illustrated a preferred electrical system employed in the control unit which may be electrically connected to a generating volt meter as hereinabove mentioned or to a probe element such as described above.

Referring to the drawings, the electrical potential picked up by the probe 15 is converted to a small alternating current by means of a vibrating capacitor electrometer 51 which is a well-known device in the electric instrument art and commercially available. The alternating current signal is amplified in an electronic amplifier 52 and demodulated to a proportional direct current by the electromechanical chopper 53 such as those commonly used to perform this function and commercially available. The direct current thus obtained, or, alternatively a direct current obtained from a generating volt meter sensing the field in the vapor space above the liquid in the receiving tank, is fed to two devices either in series or in parallel as shown. The first device is a polarized direct current relay 54 which operates in response to a change in the direction of the current flowing to it, and which actuates the high voltage contactors 56 to supply high voltage to the charge emitter with the proper polarity. The contactors 56 are magnetically operated high voltage switches, and preferably, are of the vacuum type. The contactors 56 are commercially available items. The other device to which the direct current from the sensing element is fed is a magnetic amplifier device 57 manufactured specifically to trigger silicon control rectifiers 57' and 57'a. The electrical system shown provides alternating current power to the high voltage supply 58 which is proportional in magnitude to the direct current fed to the control terminals of the magnetic amplifier 57. The high voltage output fed to the high voltage contactors 56 and 56a is of a magnitude proportional to the alternating current power received and the polarity is opposite to that of the direct current fed from the sensing element.

An apparatus for controlling the electrostatic charges in a liquid flowing through a piping system to receiver tank was operated employing a sensing element which consisted of a pointed 16 gauge copper wire installed adjacent the inlet to the tank but insulated from the tank and the conduit, and a Keithley Electrometer set to read amperes was attached to the probe. Transformer oil was passed rapidly through the filling line to the tank to build up an electrostatic charge in the oil. The electrometer indicated a current flow of $1 \times 10^{-11}$ amperes flowing from the probe. Direct current was supplied to a charge emitter which comprised a set of two copper mesh screens positioned in the filling line upstream of the probe. The direct current source was provided by transforming an alternating current, rectifying, and passing the rectified direct current through a filter capacitor and a reversing switch to the emitter. The metal screens were insulated from the line and spaced apart, with an electrical lead brought out from each screen to the reversing switch. A voltage regulating device (Variac) was provided for varying the voltage from the direct current source to the screens in contact with the oil. The polarity and magnitude of the voltage applied to the screens were adjusted until the accumulated charge become neutralized and the electrometer reading was zero. At this point the electrical charge accumulated in the flowing transformer oil was substantially zero, and at least at a safe level below which sparking electrostatic discharges would not occur.

In another experiment, apparatus as described above was employed in a similar test made using a copper mesh screen in place of the copper wire probe. Substantially the same results were obtained as in the above-described experiment.

The foregoing experiment has been described for the purpose of illustrating the present invention and is not intended to serve as a limitation thereon. From the above description it is seen that the present invention is capable of controlling the build-up of static electrical charges in a fluid stream at a safe level.

From the foregoing description various modifications in the details of construction and operation of the present invention will become apparent to the skilled artisan, and as such, these fall within the spirit and scope of the present invention.

What is claimed is:

1. Apparatus for controlling the electrical charge in a liquid which comprises means for sensing the polarity and magnitude of electrical charges accumulated in a liquid contacted with and moved relative to a solid body; charge emitter means for imparting an electrical charge of known polarity and magnitude to said liquid; power supply means connected to said emitter means; electrical means connected to said emitter means for regulating the polarity and magnitude of said charge imparted to said liquid by said emitter means to effectively maintain the electrical charge accumulated in said liquid at a predetermined level.

2. The apparatus of claim 1 wherein said emitter means is positioned in a conduit carrying said liquid and in direct contact with said liquid.

3. The apparatus of claim 1 wherein said sensing means is positioned in a conduit carrying said liquid downstream of said emitter means, and in direct contact with said liquid.

4. The apparatus of claim 1 wherein said electrical regulating means is electrically connected to said sensing means, and comprises means for supplying direct current to said emitter means which is proportional in magnitude to current received from said sensing means and switching means responsive to the polarity of the current from said sensing means to change the polarity of the current supplied to said emitter means.

5. The apparatus of claim 1 wherein said sensing means is positioned downstream of said emitter means in the vapor space of a receiver for said liquid.

6. Apparatus for controlling the accumulation of electrical charges in a moving liquid which apparatus comprises a conduit for carrying said liquid; a charge emitting element positioned in said conduit in direct contact with said liquid; power supply means; a sensing element positioned downstream of said emitting element to sense the polarity and magnitude of the electrical charge accumulated in liquid which has been moved past said emitting element; a control unit electrically connected to said power supply, said emitting element and said sensing element, said control unit being responsive to the sensed electrical charge and causing direct electrical current to be supplied to said emitting element, which supplied current is opposite in polarity to said sensed charge and proportional in magnitude to current received from said sensing element.

7. The apparatus of claim 6 wherein said sensing element is positioned in said conduit in direct contact with said liquid.

8. The apparatus of claim 6 wherein said sensing element is positioned in the vapor space of a receiver for said liquid.

9. The apparatus of claim 6 wherein said control unit comprises: means for producing a direct current from said sensing element; means for receiving said direct current from said sensing element; output means coupled with said receiving means for supplying a direct current to said emitting element which is proportional in magnitude to current received from said sensing element; and switching means coupled with said receiving means and said output means, said switching means responsive to the polarity of the direct current from said sensing element to change the polarity of the current supplied by said output means to said emitting element; said current supplied to said emitting element is of such a polarity and magnitude to effectively maintain the electrical charge accumulated in said liquid at a predetermined level.

References Cited in the file of this patent

UNITED STATES PATENTS

| | | |
|---|---|---|
| 2,386,647 | Andresen | Oct. 9, 1945 |
| 2,885,612 | Larsen | May 5, 1959 |